United States Patent [19]

Hattori et al.

[11] Patent Number: 4,677,880
[45] Date of Patent: Jul. 7, 1987

[54] METHOD OF CONTROLLING AUTOMATIC TRANSMISSION IN ACCORDANCE WITH ENGINE OPERATION

[75] Inventors: Toshihiro Hattori, Ayase; Makoto Uriuhara, Yokohama; Hitoshi Kasai; Yasuyoshi Asagi, both of Kawasaki, all of Japan

[73] Assignees: Isuzu Motors Limited, Tokyo; Fujitsu Limited, Kawasaki, both of Japan

[21] Appl. No.: 685,543

[22] Filed: Dec. 24, 1984

[51] Int. Cl.$^4$ ............ B60K 41/18; B60K 41/10
[52] U.S. Cl. ........................ 74/866; 74/858; 192/0.052; 192/0.092; 192/0.09
[58] Field of Search ........... 74/866, 859, 860, 858, 74/872; 192/0.044, 0.052, 0.055, 0.08, 0.073, 0.09, 0.092

[56] References Cited

U.S. PATENT DOCUMENTS

| | | | |
|---|---|---|---|
| 3,323,621 | 6/1967 | Péras | 74/858 X |
| 3,335,830 | 8/1967 | de Coye de Castelet | 74/858 X |
| 4,226,141 | 10/1980 | Espenschied | 74/858 |
| 4,262,783 | 4/1981 | Scarrott et al. | 74/866 X |
| 4,266,447 | 5/1981 | Heess et al. | 74/866 X |
| 4,267,750 | 5/1981 | Espenschied et al. | 74/866 |
| 4,281,751 | 8/1981 | Suga et al. | 192/0.092 |
| 4,353,272 | 10/1982 | Schneider et al. | 74/859 |
| 4,355,550 | 10/1982 | Will et al. | 74/858 X |
| 4,493,228 | 1/1985 | Vukovich et al. | 74/859 X |
| 4,551,802 | 11/1985 | Smyth | 74/866 |

FOREIGN PATENT DOCUMENTS 0121342 7/1983 Japan ........................... 74/859

Primary Examiner—Allan D. Herrmann
Assistant Examiner—Dirk Wright
Attorney, Agent, or Firm—Staas & Halsey

[57] ABSTRACT

A method of controlling a shifting operation of a synchro mesh type automatic transmission in a vehicle, such as an automobile. The method includes the steps of (i) detecting the running state of the vehicle, (ii) determining an optimum gear position from the vehicle running condition, (iii) determining if the optimum gear position is higher than a gear position of the transmission, (iv) determining if the engine torque is greater than or equal to a predetermined value and reducing the engine torque below the predetermined value, if the optimum gear position is higher than the gear position of the transmission, (v) disengaging a clutch to disconnect an engine and the transmission, (vi) shifting the transmission to the optimum gear position, and (vii) engaging the clutch. Moreover, the engine torque is reduced before the clutch is released—by reducing the fuel supply to the engine—so that abrupt decelerations and declutching shocks caused by conventional shifting methods are not felt by the driver.

6 Claims, 7 Drawing Figures

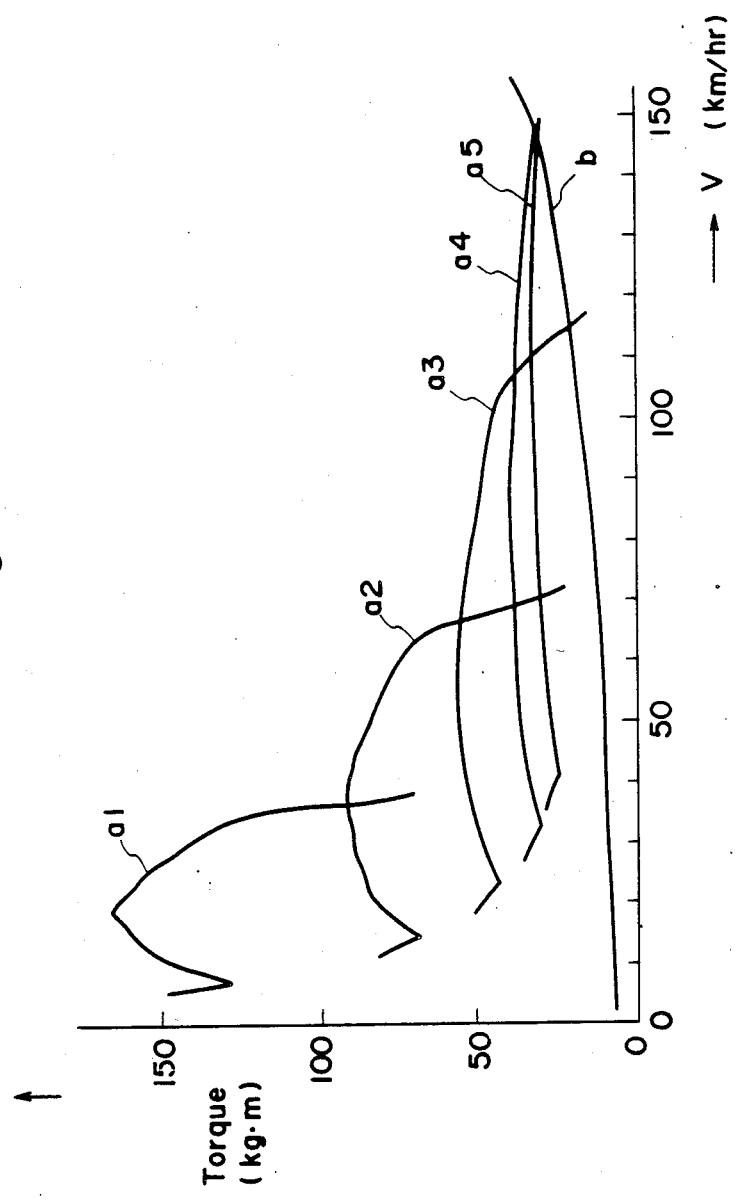

METHOD OF CONTROLLING AUTOMATIC TRANSMISSION IN ACCORDANCE WITH ENGINE OPERATION

BACKGROUND OF THE INVENTION

1. Field of the Invention

The present invention relates to a synchromesh type automatic transmission of a vehicle such as an automobile and, more particularly, to a method of controlling a shifting operation of the automatic transmission which can prevent the driver of the vehicle from feeling such an abrupt deceleration as might otherwise be experienced upon the shifting operation during vehicle acceleration.

2. Description of the Prior Art

In recent years, automatic transmissions have been used widely in vehicles. Automatic transmissions have their shifting operation controlled by detecting the running speed of the vehicle and the depression of an accelerator pedal to select the optimum speed change from the relationship inbetween. A clutch for connecting an engine and the transmission is disengaged before and engaged after the shifting operation. Therefore, the automatic shifting operation follows the procedure including declutching, shifting and clutching operations, and the clutch is left unapplied in that procedure so that the drive force of the engine is not transmitted to the drive shaft of the vehicle. This interruption of the transmission of the driving force has been conceded as being unavoidable in the operation of the transmission.

If, however, the shifting operation is conducted during an acceleration while the accelerator pedal being depressed, the clutch is released for the operation so that the driver feels the deceleration of the vehicle. The shocks in the declutching operation further increases the uncomfortable feeling of the driver. These deceleration and declutching shocks are desperately left as they are because it is necessary to release the clutch for the shifting operation.

SUMMARY OF THE INVENTION

It is, therefore, an object of the present invention to provide a method of controlling the shifting operation of an automatic transmission of a vehicle, which can prevent a driver from feeling less uncomfortable by reducing a surplus engine torque during a shifting operation of the transmission to reduce an abrupt deceleration which might otherwise be caused during a shifting operation for acceleration.

Another object of the present invention is to provide an automatic transmission shifting operation controlling method of the above type, which can also prevent the driver from feeling less uncomfortable by dropping the surplus engine torque, before the clutch is released for the shifting operation, thereby to reduce the declutching shocks.

Still another object of the present invention is to provide an automatic transmission shifting operation controlling method of the above type, which can improve the drive feeling by reducing the abrupt deceleration especially at a low-speed position.

The present invention is based upon a discovery that the deceleration felt by the driver when the clutch is released is caused as a result of abrupt reduction in the acceleration that is the actual deceleration does not contribute very much to the deceleration felt by the driver. Specifically, it frequently occurs in the shifting operation at a lower-speed position that the driver feels the deceleration while the vehicle is being accelerated. This is thought to come from the fact that the driving torque at the low-speed position is high enough to establish a surplus acceleration and that the excess acceleration is abruptly dropped to zero by the declutching operation. This reasoning applies to the declutching shocks which are caused by the declutching operation.

According to the present invention, therefore, when the vehicle speed is increased during the acceleration so that the transmission is to be shifted up, the clutch is released after the supply rate of a fuel to the engine is reduced to drop the surplus torque.

In the shifting operation controlling method of the present invention, which follows the ordinary procedure of declutching, shifting of the transmission, and clutching, specifically, in the case of an upshifting for the shifting operation, the supply rate of the fuel to the engine is reduced to drop the surplus torque prior to the declutching operation so that the abrupt deceleration feeling in the declutching operation may be softened.

According to a major feature of the present invention, there is provided a method of controlling a shifting operation of a synchromesh type automatic transmission of a vehicle comprising the steps of:

(1) of detecting the running state of said vehicle;
(2) determining the optimum speed position from the detected vehicle running condition;
(3) judging the necessity for a shifting operation of said automatic transmission;
(4) releasing a clutch to disconnect an engine and said automatic transmission;
(5) shifting said automatic transmission to said optimum speed position; and
(6) applying said clutch, wherein the improvement comprises:
(7) judging whether the shifting operation judged necessary at step (3) is upshifting or not;
(8) judging whether the output power of said engine is in surplus for that necessary for accelerating said vehicle or not, if the upshifting operation is judged necessary at step (7); and
(9) reducing the supply rate of a fuel to said engine to drop the surplus torque of said engine to a predetermined level prior to step (4) if the surplus engine output power is judged at step (8).

BRIEF DESCRIPTION OF THE DRAWINGS

Other objects, features and advantages of the present invention will become apparent from the following description taken in conjunction with the accompanying drawings, in which:

FIG. 1 is a diagram showing characteristic torque curves of a vehicle using the speed positions of an automatic transmission as parameters for explaining the principle of the present invention;

DESCRIPTION OF THE PREFERRED EMBODIMENT

The present invention will be described in detail in the following with reference to the accompanying drawings.

In FIG. 1, showing the performance characteristics of a vehicle for explaining the principle of the present invention, the abscissa indicates the running speed of the vehicle whereas the ordinate indicates the torque of an engine. In FIG. 1, moreover, characteristic torque curves a1, a2, a3, a4 and a5 are plotted against the vehicle speed for the ranges 1st, 2nd, 3rd, 4th and 5th speed positions, respectively, and curve b indiates a proving-ground running resistance. Incidentally, the characteristic torque curves against the vehicle speed are taken under the condition that the throttle opening is 100%. It is apparent from FIG. 1 that the torques are higher for the lower-speed positions and lower for the higher-speed positions. It is also found that the proving-ground running resistance becomes the higher for the higher vehicle speed. In other words, the proving-ground running resistance is higher for the shifting operation with a higher-speed gear than for that with a lower-speed gear. Despite of this fact, however, the deceleration felt really by the driver is caused during the shifting operation with the lower-speed gear.

With the lower-speed gear, on the other hand, since the driving torque is the higher, as seen from FIG. 1, a relatively high surplus torque or accelerating torque (i.e., the difference between the driving torque and the proving-ground torque) is established and a relatively high surplus acceleration is established while the vehicle is accelerated to run. When the clutch is released for the shifting operation, the acceleration is dropped to zero or less so that this abrupt change in the acceleration is felt as a high deceleration when the shifting operation is carried out between the lower-speed gears.

The shocks in the declutching operation are similarly caused by the abrupt reversal (or change) of the torque because the driving system of the vehicle is twisted by the driving torque during acceleration and the twisting torque is abruptly released when the clutch is released.

According to the present invention the surplus torque is reduced in prior to the declutching, for the shifting operation, so that the driver may be prevented from feeling the abrupt deceleration and shocks.

Figure 2:
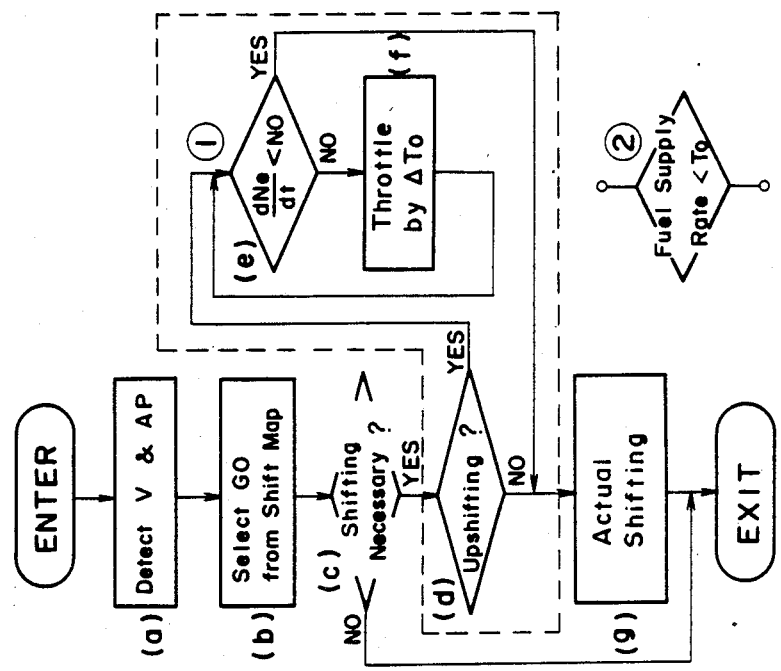
FIG. 2 is a diagram showing characteristic torque curves using the opening of a throttle valve at a first speed position as parameters for explaining the principle of the present invention.

Turning now to FIG. 2 showing the characteristic curves of the performance of the vehicle for explaining the principle of the present invention, the abscissa indicates the running speed of the vehicle whereas the ordinate indicates the torque of the engine. In FIG. 2, characteristic torque curves a10, a19, a18, a17, a16 and a15 are plotted against the vehicle speed for throttle valve openings of 100%, 90%, 80%, 70%, 60% and 50%, respectively, at the first speed position. A characteristic torque curve a20 is plotted against the vehicle speed in case the throttle valve has an opening of 100% at the second speed position.

If it is assumed, according to a conventional shifting method, that the shifting vehicle speed is $V_0$ when an upshift from the first to second speeds is conducted and that the throttle opening of 100% (i.e., the actual depression of 100% of the accelerator pedal), the clutch is released according to prior art when the torque is at a point m of the curve a10. According to the present invention, on the contrary, the throttle opening is forcibly returned in the closed direction, e.g., to 50%, and the declutching operation is conducted at a point m' of the curve a15.

For this control, the number of r.p.m. of the engine is detected while the throttle opening is being reduced and the clutch is released assuming that the surplus torque has become low, when the change is the number of r.p.m. of the engine becomes lower than a predetermined value. Further, the timing at which the throttle opening is restored to a value corresponding to the depression of the accelerator pedal may occur after the clutch is applied or released.

Next, the method of controlling the shifting operation of the automatic transmission according to one embodiment of the present invention will be described in the following.

Figure 3:
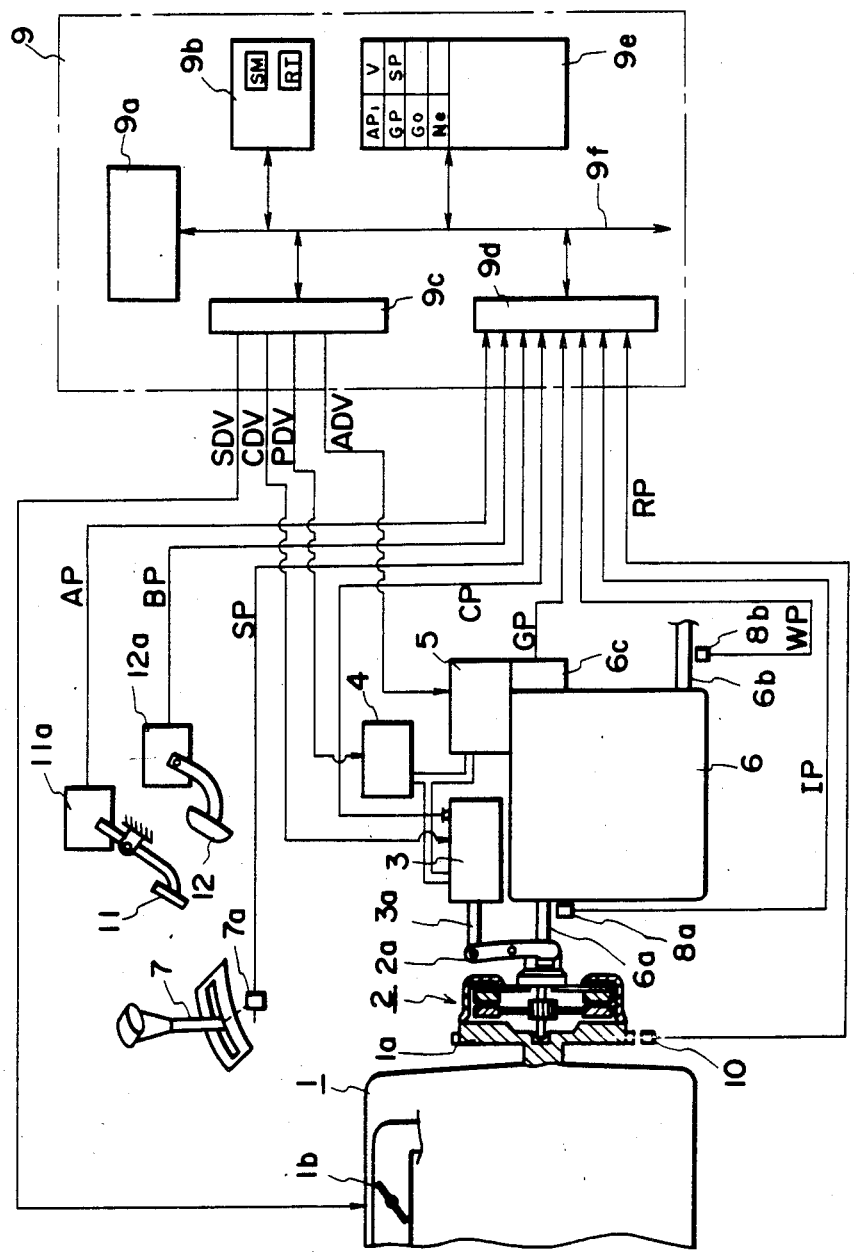
FIG. 3 is a block diagram showing an automatic transmission and a control system for operation by a method according to one embodiment of the present invention.

In FIG. 3, reference numeral 1 indicates an engine which is equipped with both a throttle valve 1b for controlling the flow rate of an intake gas (such as air or an air-fuel mixture) and a flywheel 1a. Indicated at numeral 2 is a clutch body which is constructed of friction elements of the known type and equipped with a release layer 2a. Indicated at numeral 3 is a clutch actuator which has a piston rod 3a adapted to drive the release lever 2a so as to control the extent of engagement of the clutch body 2. Numerals 4 and 5 indicate a hydraulic system and a transmission actuator, respectively, which will be described below. Indicated at numeral 6 is a synchromesh type automatic transmission which is driven by the transmission actuator 5 to conduct the speed changing operations. The automatic transmission 6 is equipped with an input shaft 6a connected to the clutch 2, an output shaft (or a drive shaft) 6b, and a gear position sensor 6c for detecting a speed position (or a gear position). Indicated at numeral 7 is a selector lever which is manipulated by a driver so that one of an "N" range (i.e., a neutral position), a "D" range (i.e., an automatic speed changing position), a "1st" range (i.e., a first speed), a "2nd" range (i.e., a second speed), a "3rd" range (i.e., an automatic speed changing position among the first, second and third speeds), and an "R" range (i.e., a reverse position) can be selected in accordance with the position of the selector lever 7. A selected position signal SP indicating a selected range is output by a select sensor 7a. Indicated at numeral 8a is a revolution sensor for detecting the r.p.m. of the input shaft 6a. Indicated at numeral 8b is a vehicle speed sensor for detecting the vehicle speed in terms of the r.p.m. of the drive shaft 6b. Indicated at numeral 10 is an engine revolution sensor for detecting the r.p.m. of the engine 1 in terms of the r.p.m. of the flywheel 1a. Generally indicated at numeral 9 is an electronic control unit. This electronic control unit 9 is composed of: a processor 9a for arithmetic processings; a read only memory (referred to as a "ROM") 9b for storing a control program for controlling the automatic transmission 6, the clutch 3 and the throttle valve 1b; an output port 9c; an input port 9d; a random access memory (referred to as a "RAM") 9e for storing the computed results; and an address data bus (which (referred to as a "BUS") 9f connecting the foregoing components. The output port 9c is connected with the clutch actuator 3, the hydraulic system 4, the transmission actuator 5 and the throttle valve 1b for outputting drive signals CDV, PDV and ADV to drive them, respectively. The input port 9d is connected with the clutch actuator 3 the various sensors 6c, 7a, 8a, 8b and 10, an accelerator pedal 11 and a brake pedal 12, the latter two of which will be described in the following, for receiving detected signals from the various components. The accelerator pedal 11 is equipped with a sensor (i.e., a potentiometer) 11a for generating a signal AP indicating the depth of depression of the accelerator pedal 11. The brake pedal 12 is equipped wih a sensor 12a (e.g., a potentiometer or a switch) for generating a signal BP indicating the depth of depression of the brake pedal 12.

Figure 4:
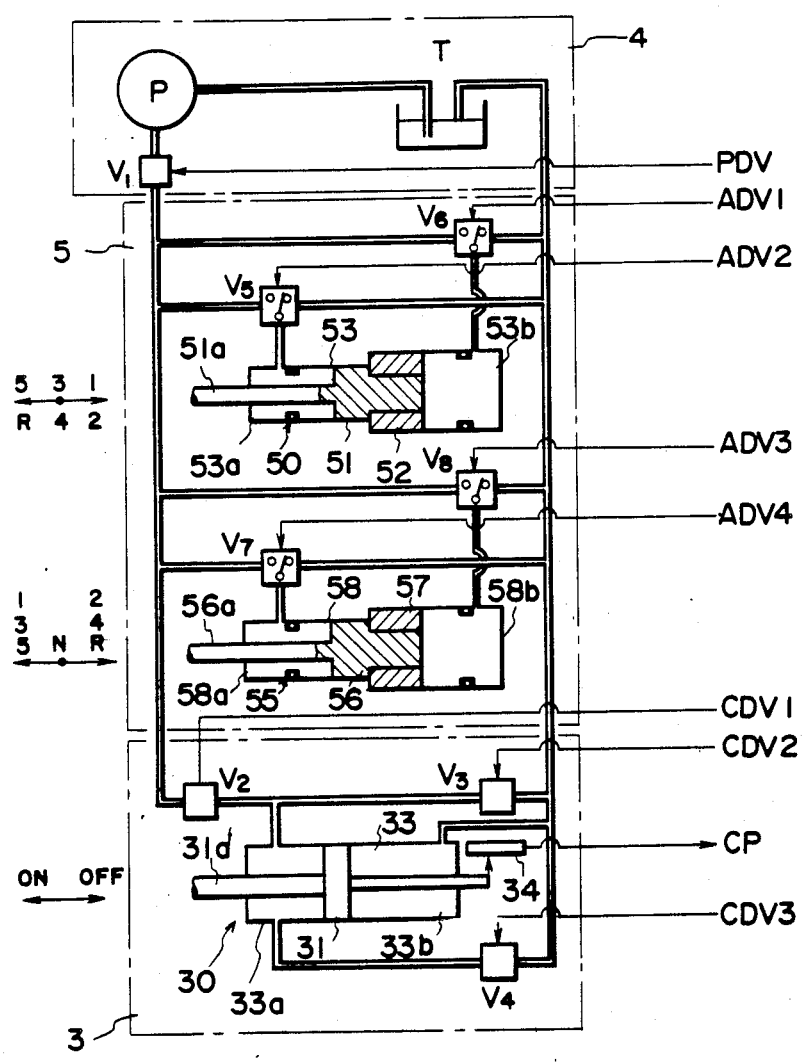
FIG. 4 is a schematic view showing the construction of clutch and transmission actuators and a hydraulic system.

FIG. 4 shows the constructions of the aforementioned clutch and transmission actuators and hydraulic system 3, 5 and 4, respectively. In FIG. 4, reference letters T, P and $V_1$ indicate a tank, an oil pump and an on-off valve, respectively, which constitute the hydraulic system 4.

The clutch actuator 3 is composed of a cylinder 33, a piston 33 and a piston rod 31a (or 3a in FIG. 3) having one end connected to the piston 31 and the other end connected to the release lever 2a of the clutch 2. The actuator 3 has one chamber 33a communicating, through an on-off valve $V_2$, with the pump P (through the aforementioned on-off valve $V_1$) and, through an on-off valve $V_3$ and a pulse-controlled on-off valve $V_4$, with the tank T. On the other hand, the other chamber 33b of the actuator 3 communicates with the tank T at all times. Reference numeral 34 indicates a position sensor for detecting the position of the piston rod 31a to output the extent of engagement of the clutch 2.

When the on-off valve $V_2$ is opened in response to a drive signal CDV1, oil or hydraulic pressure is applied to the chamber 33a so that the piston 31 is moved to the right, as viewed in FIG. 4, to turn off (or release) the clutch 2. When the on-off valves $V_3$ and $V_4$ are opened in response to drive signals CDV2 and CDV3, the oil pressure of the chamber 33a is released so that the piston 31 is moved to the left to turn on (or apply) the clutch 2. Here, this clutch 2 is gradually turned on because the on-off valve $V_4$ is pulse-driven in response to the drive signal CDV3.

The transmission actuator 5 is composed of a select actuator 50 and a shift actuator 55. These select and shift actuators 50 and 55 are constructed to take three positions and are composed, respectively, of stepped cylinders 53 and 58, first pistons 51 and 56, and second pistons 52 and 57 made cylindrical to be fitted on the corresponding first pistons 51 and 56. These first pistons 51 and 56 have their respective rods 51a and 56a engaging with the internal levers (not shown) of the transmission 6. The two actuators 50 and 55 are in the shown neutral states when an oil pressure is exerted upon both the respective two chambers 53a and 53b, and 58a and 58b of their stepped cylinders 53 and 58. When the oil pressure is applied to the respective chambers 53a and 58a, the first pistons 51 and 56 are moved to the right, as shown in FIG. 4, together with the second pistons 52 and 57. When the oil pressure is applied to the respective chambers 53b and 58b, only the first pistons 51 and 56 are moved to the left.

The chambers 53a and 53b of the select actuator 50 are made to communicate through change-over valves $V_5$ and $V_6$, respectively, with the pump P (through the on-off valve $V_1$) or the tank T. On the other hand, the chambers 58a and 58b of the shift actuator 55 are made to communicate through change-over valves $V_7$ and $V_8$, respectively, with the pump P (through the on-off valve $V_1$) or with the tank T.

As shown, the transmission 6 is in the neutral position. When the change-over valve $V_7$ has its connection switched to the pump P in response to a drive signal ADV4 and the change-over valve $V_8$ is switched to the tank T in response to a drive signal ADV3, the transmission 6 establishes the fourth speed. When a speed change signal from the fourth speed to the fifth speed is generated, the change-over valves $V_8$ and the $V_7$ first have their connections switched to the pump P in response to the drive signals ADV3 and ADV4 to return the shift actuator 55 to the shown neutral state. Then, the connection of the change-over valve $V_6$ is switched to the pump P in response to a drive signal ADV1 and the connection of the change-over valve $V_5$ is switched to the tank T so that the select actuator 50 is shifted to a 5th-speed-reverse select position. Then, the change-over valve $V_8$ has its connection switched to the pump P in response to the drive signal ADV3 and the change-over valve $V_7$ has its connection switched to the tank T so that the shift actuator 55 is shifted to a 5th-speed position to change the speed of the transmission 6 to the 5th speed. Thus, the speed changing operations to the respective speeds can be performed by switching the change-over valves $V_6$ and $V_5$, and $V_8$ and $V_7$, in response to the drive signals ADV1 and ADV2, and ADV3 and ADV4, to alternately operate the select actuator 50 and the shift actuator 55.

The operations of the embodiment shown in FIG. 3 will be described in the following.

(1) First, when the select lever 7 is manipulated to the "D" range so that the selected position signal SP of the "D" range is input from the position sensor 7a to the input port 9d. The processor 9a reads the signal SP through the BUS 9f and stores it in the RAM 9e. Then, the processor 9a outputs the drive signal ADV to the transmission actuator 5 from the output port 9c so that the actuator 5 is driven to shift the transmission 6 to the 1st speed.

(2) Next, the processor 9a receives a selected gear signal GP from the gear position sensor 6c via its input port 9d to detect that the transmission 6 is shifted to the 1st speed, and stores the signal GP in the RAM 9e.

Figure 6:
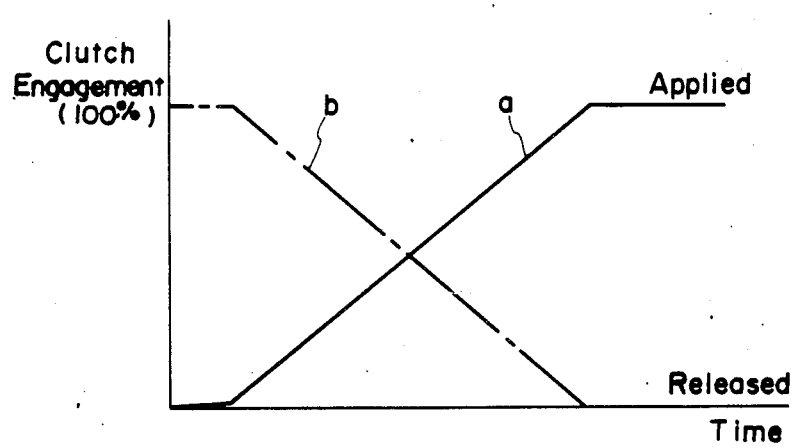
FIG. 6 is an explanatory diagram showing the operations of a clutch.

(3) Next, in response to the signal of the accelerator sensor 11a, the processor 9a sends the clutch drive signal CDV, via the output port 9c, to the clutch actuator 3 so that this actuator 3 gradually moves the piston rod 3a to the left to gradually move the release lever 2a to the left. As a result, as indicated by a curve a in FIG. 6, the clutch 2 has its percentage of engagement changed so that it is shifted from a released state through a partially applied state to an applied state. Thus, the vehicle starts its run.

Figure 7:
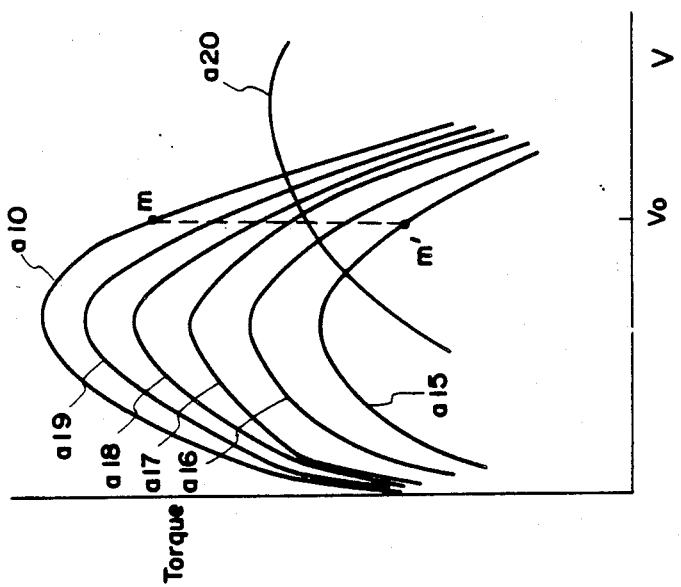
FIG. 7 is a flow chart showing the processing of the method according to an embodiment of the present invention.

(4) Subsequently, the optimum speed position is determined in the following manner, in accordance with a vehicle speed V, an accelerator pedal depression AP and the selected signal SP of the selector lever 7, so that the shifting operation of the automatic transmission is executed. This optimum speed position determination will be described with reference to FIG. 7, showing the processing flow chart of the control method according to the embodiment of the present invention; in particular, the block defined by the broken line is the featured portion which is added by the present invention.

(a) First, the processor 9a periodically receives a detected speed signal (in the form of pulses) WP from the speed sensor 8b via the input port 9d, computes a vehicle speed V from the signal WP and stores the vehicle speed V in the RAM 9e. The processor also receives a signal AP indicating the depression of the accelerator pedal 11 from the sensor 11a, via the input port 9d, and stores it the depression signal AP in the RAM 9e. The processor detects the running state of the vehicle from the signals V and AP. At this time, if the processor 9a is constructed to control the opening of the throttle valve 1b in accordance with the accelerator pedal depression AP, the processor 9a outputs a drive signal SDV, via its output port 9c, to open the throttle valve 1b in accordance with the depression AP. If the drive mechanism of the throttle valve 1b is constructed of, for example, a step motor the drive signal SDV is composed of pulses in a number corresponding to the throttle opening.

Figure 5:
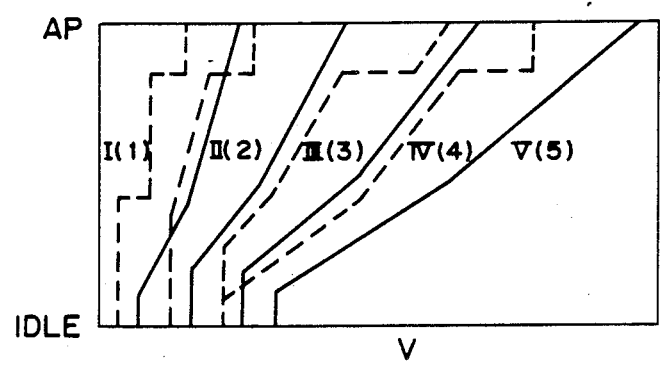
FIG. 5 is an explanatory diagram showing a shift map for the transmission and control system of FIG. 3.

(b) Next, the processor 9a uses the vehicle speed V and the depression AP to determine an optimum speed position GO from a shift map corresponding to the vehicle speed V and the depression AP, the shift map being stored as a part of the control program of the ROM 9b. Specifically, the ROM 9b stores a table with the shift map which corresponds to the vehicle speed V and the depression AP, as shown in FIG. 5. In FIG. 5, the respective speed change positions are indicated by curves I, II, III, IV and V; the solid curves indicate the boundaries for upshifting whereas the broken curves indicate the boundaries for downshifting. Moreover, the optimum speed position GO is determined from the depression AP and the vehicle speed V.

(c) Next, the processor 9a detects the present gear (or speed) position GP from the gear position sensor 6c, via the input port 9d, and stores it in the ROM 9e. Additionally, the processor 9a compares the gear position GP and the optimum gear position GO and determines whether a shifting operation is necessary upshifting if GO>GP (i.e., the optimum speed position GO is higher than the present speed position GP) and downshifting if GO<GP (i.e., the optimum speed position GO is lower than the present speed position GP). If it is judged that shifting is unnecessary, this step is ended to return again to the step (a).

(d) If shifting is judged necessary, the processor 9a then determines whether the shifting necessary is upshifting or downshifting. In the case of the downshifting, the processing advances to a later-described step (g).

(e) After determining that upshifting is necessary, the processor 9a detects the r.p.m. Ne of the engine from the revolution sensor 10, via the input port 9d. Then, the processor 9a derives the change of the engine r.p.m. Ne per unit time, i.e., an engine revolving acceleration dNe/dt by the use of an engine r.p.m. previously detected and compares the change of the engine r.p.m. with a predetermined acceleration or change in r.p.m. No., corresponding to a predetermined amount of surplus torque (as indicated by an encircled numeral 1). If dNe/dt<No (i.e, if the detected acceleration is smaller than the predetermined acceleration) the processor 9a proceeds its processing to the step (g).

(f) If dNe/dt≧No (i.e., if the detected acceleration or change is equal to or larger than the predetermined acceleration), the processor 9a shuts the throttle valve 1b by a predetermined extent ΔTo, assuming that the surplus torque is still at a high value. Specifically, the processor 9a sends the drive signal SDV, which has such a pulse number as to return the throttle valve 1b by the extent ΔTo, to the drive mechanism (although not shown) of the throttle valve 1b to control the opening of the throttle valve 1b. Incidentally, the predetermined extent ΔTo is set at such a value which drops the r.p.m. of the engine 1 gradually not abruptly. Then, the processor 9a returns its processing to the step (e). As a result, the engine 1 allows its throttle valve 1b to gradually reduce its opening so that engine r.p.m. is gradually dropped.

(g) If it is determined at step (d), that a down shifting operation is necessary and at step (e) that dNe/dt<No, the actual shifting operation is started.

First, the processor 9a sends the clutch driving signal CDV to the clutch actuator 3, via output port 9c. Then, oil pressure is applied to the chamber 33a of the cylinder 33 of the clutch actuator 3 to return the piston rod 3a (or 31a) to the right, as viewed in FIG. 4, so that the release lever 2a is returned to the right to gradually release the clutch 2, as shown by curve b in FIG. 6.

Next, the processor 9a feeds the transmission actuator 5, via BUS 9f and output port 9c, with the drive signal ADV for effecting the optimum speed position GO in the automatic transmission 6. As a result, in the transmission actuator 5, the built-in select and shift actuators 50 and 55 connected to the hydraulic system 4 are hydraulically controlled so that the transmission 6 is brought into the desired speed position in a synchronously meshing manner.

After the end of the shifting operation, the processor 9a sends the clutch drive signal CDV to the clutch actuator 3, as in the starting operation, to apply the clutch 2. Then, the processing is returned again to the step (a).

Thus, in the case of the upshifting for acceleration, the clutch is released after the throttle valve is returned in the closed direction to reduce the surplus torque.

As has been described, according to the method of the present invention the throttle valve of the engine is returned in the closed direction prior to the declutching operation for the start of the shifting operation so as to reduce any surplus torque. As a result, the method of the invention prevents the driver from feeling the abrupt deceleration and the strong shocks when the clutch is released for the shifting operation. By suppressing the revolving acceleration of the engine in advance, moreover, there can be attained another effect that the engine is not accelerated without a load when the clutch is released. As a result, the uncomfortableness in the drive feeling by the automatic transmission can be obviated to ensure a smooth shifting operation.

The present invention has been described in connection with one embodiment thereof, but can be modified in various manners within the scope disclosure. For example, if fuel supply means, for providing a remarkably accurate correlation between the fuel supply rate and the engine output power, such as a fuel injection pump, is used as the fuel supply controller which was exemplified by the throttle valve in the foregoing embodiment, the judging step, as indicated by the encircled numeral 1 in FIG. 7, can be conducted by comparing the fuel supply rate itself with a predetermined value Fo, as indicated by an encircled numeral 2. This modification should not be excluded from the scope of the present invention.

What is claimed is:

1. A method of controlling a shifting operation of a synchromesh type automatic transmission coupled to an engine in a vehicle, comprising the steps of:
   (1) detecting a vehicle speed, an accelerator pedal position, a selected gear position and an engine torque;
   (2) determining an optimum gear position form a shift map based on the vehicle speed and the acceleration pedal position;
   (3) comparing the optimum gear position with the selected gear position;
   (4) determining if the engine torque is greater than or equal to a predetermined torque value, if the optimum gear position is greater than the selected gear position;
   (5) reducing the supply of fuel to an engine, if the engine torque determined in step (4) is greater than the predetermined torque value, to reduce the engine torque below the predetermined torque value;
   (6) releasing a clutch to disconnect the engine and the automatic transmission when the engine torque is less than the predetermined torque value;
   (7) shifting the automatic transmission to the optimum gear position; and
   (8) engaging the clutch.

2. An automatic transmission shifting operation control method according to claim 1, wherein step (5) includes reducing the opening of a throttle valve.

3. An automatic transmission shifting opertion control method according to claim 1, further comprising the step of restoring the fuel supply after step (6).

4. An automatic transmission shifting operation control method according to claim 1, further comprising the step of restoring the fuel supply after step (8).

5. An automatic transmission shifting operation control method according to claim 1, wherein step (4) includes comparing a change in revolutions per minute of the engine with a predetermined value to determine if the engine torque is greater than the predetermined torque value.

6. An automatic transmission shifting operation control method according to claim 1,
   wherein the automatic transmission has an output shaft, and
   wherein said detecting of the vehicle speed in step (1) is performed periodically by detecting revolutions per minute of the output shaft of the automatic transmission.

* * * * *